United States Patent
Nilsson et al.

(10) Patent No.: US 9,035,822 B2
(45) Date of Patent: May 19, 2015

(54) INTERMITTENT FILLING LEVEL DETERMINATION WITH DYNAMICALLY DETERMINED NUMBER OF MEASUREMENTS

(75) Inventors: Leif Nilsson, Linköping (SE); Håkan Delin, Linköping (SE); Håkan Nyberg, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 429 days.

(21) Appl. No.: 13/525,580

(22) Filed: Jun. 18, 2012

(65) Prior Publication Data

US 2013/0335262 A1    Dec. 19, 2013

(51) Int. Cl.
  *G01S 13/08* (2006.01)
  *G01F 23/00* (2006.01)
  *G01F 23/284* (2006.01)
  *G01S 13/88* (2006.01)
  *H01Q 1/22* (2006.01)

(52) U.S. Cl.
  CPC ............ *G01F 23/0069* (2013.01); *G01S 13/88* (2013.01); *H01Q 1/225* (2013.01); *G01F 23/0076* (2013.01); *G01F 23/284* (2013.01)

(58) Field of Classification Search
  CPC ............. G01F 23/284; G01F 23/2962; G01F 25/0061; G01F 23/0069; G01F 23/2845; G01F 23/0061; G01F 23/0076; G01S 13/88; G01S 13/08; G01S 7/03; G01S 13/103; G01S 2007/4078; G01S 7/40
  USPC .................. 342/118, 124; 324/644; 73/290 R
  See application file for complete search history.

(56) References Cited

U.S. PATENT DOCUMENTS

| | | | | |
|---|---|---|---|---|
| 5,111,201 A * | 5/1992 | Matsumura et al. | ..... | 340/870.38 |
| 5,160,933 A * | 11/1992 | Hager | ........................... | 342/174 |
| 5,689,265 A * | 11/1997 | Otto et al. | ..................... | 342/124 |
| 6,014,100 A * | 1/2000 | Fehrenbach et al. | .......... | 342/124 |
| 6,078,280 A * | 6/2000 | Perdue et al. | .................. | 342/124 |
| 6,634,228 B2 * | 10/2003 | Deserno et al. | ............. | 73/290 V |
| 7,460,057 B2 * | 12/2008 | Fehrenbach et al. | .......... | 342/124 |
| 7,823,446 B2 * | 11/2010 | Nilsson et al. | .............. | 73/290 V |
| 7,884,755 B2 * | 2/2011 | Fehrenbach et al. | .......... | 342/124 |
| 7,895,889 B2 * | 3/2011 | Jirskog | ........................... | 73/293 |
| 8,447,367 B2 * | 5/2013 | Wenger | ........................ | 455/574 |
| 8,844,352 B2 * | 9/2014 | Nilsson et al. | .................. | 73/293 |
| 2006/0000275 A1 * | 1/2006 | Nilsson et al. | .............. | 73/290 V |
| 2008/0129583 A1 * | 6/2008 | Larsson et al. | ................. | 342/124 |
| 2008/0278145 A1 | 11/2008 | Wenger | | |
| 2011/0140951 A1 * | 6/2011 | Nyberg | ......................... | 342/124 |
| 2012/0169528 A1 * | 7/2012 | Edvardsson et al. | .......... | 342/124 |
| 2013/0069817 A1 * | 3/2013 | Wenger | ......................... | 342/124 |

* cited by examiner

*Primary Examiner* — Peter Bythrow
(74) *Attorney, Agent, or Firm* — Westman, Champlin & Koehler, P.A.

(57) ABSTRACT

A method of determining a filling level of a product contained in a tank using a level gauge system, comprising the steps of: transmitting a first signal towards a surface of the product; receiving a first echo signal; determining a present echo characteristic value based on the first echo signal; and comparing the present echo characteristic value and a stored echo characteristic value. If a difference between the present echo characteristic value and the stored echo characteristic value is greater than a predefined value, the method further comprises transmitting at least a second transmit signal towards the surface; receiving at least a second echo signal; and determining the filling level based on the at least second electromagnetic echo signal.

15 Claims, 3 Drawing Sheets

INTERMITTENT FILLING LEVEL DETERMINATION WITH DYNAMICALLY DETERMINED NUMBER OF MEASUREMENTS

FIELD OF THE INVENTION

The present invention relates to a level gauge system for determining a filling level of a product contained in a tank using electromagnetic signals, and to a method of determining a filling level of a product contained in a tank.

TECHNICAL BACKGROUND

Level gauge systems are widely used for determining the filling level in various types of tanks based on the time-of-flight of an electromagnetic signal to the surface of the product in the tank and back following reflection at the surface.

In recent years, there has been an increasing demand for wireless level gauge systems or level gauge systems with other limitations on energy consumption, such as for example so called loop-powered systems that may be connected by a 4-20 mA current loop. Wireless level gauge systems may, for example, be powered by batteries or solar power.

For such level gauge systems with a limited supply of energy it is advantageous to reduce the average energy consumption, as this will, for example, increase the lifetime of batteries in battery-powered systems.

A well-known way of reducing the average energy consumption of various measurement systems, including level gauge systems, is to operate the system intermittently, that is, controlling the system between an active state where measurements are performed, and an inactive state (sometimes referred to as a sleep state or a standby state) where most of the system is shut-down so that no or only very little energy is consumed.

This type of intermittent operation of a wireless level gauge system is, for example, described in US 2008/0278145. In the wireless level gauge system according to US 2008/0278145, arbitration logic ensures that active periods of the measurement unit occur when the wireless communication is inactive.

Although US 2008/0278145 provides for an energy-efficient wireless level gauge system, there appears to be room for further improvement in terms of optimizing the tradeoff between energy consumption and measurement accuracy.

SUMMARY OF THE INVENTION

In view of the above, a general object of the present invention is to provide for an improved intermittent filling level determination, in particular involving an optimized tradeoff between energy consumption and measurement accuracy.

According to a first aspect of the present invention, it is therefore provided a method of determining a filling level of a product contained in a tank using a level gauge system, the method comprising the steps of: transmitting a first electromagnetic transmit signal towards a surface of the product; receiving a first electromagnetic echo signal resulting from reflection at least one impedance transition encountered by the first electromagnetic transmit signal; determining a present echo characteristic value based on the first electromagnetic echo signal; and comparing the present echo characteristic value and a stored echo characteristic value, wherein the method further comprises the steps of: if a difference between the present echo characteristic value and the stored echo characteristic value is greater than a predefined value: transmitting at least a second electromagnetic transmit signal towards the surface; receiving at least a second electromagnetic echo signal resulting from reflection at least one impedance transition encountered by the second electromagnetic transmit signal; and determining the filling level based on the at least second electromagnetic echo signal, and if a difference between the present echo characteristic value and the stored echo characteristic value is less than the predefined value: determining the filling level based on stored data indicative of at least one previous filling level measurement.

The electromagnetic transmit signal transmitted towards the surface of the product inside the tank may be a pulse train or a substantially continuous signal. In the former case, the pulses may either be DC-pulses or a modulated carrier signal. Furthermore, depending on the situation, the time-of-flight of the electromagnetic signal to the surface and back may be determined using different methods, such as so-called TDR (time domain reflectometry) or FMCW (frequency modulated continuous wave).

By "echo characteristic" should be understood any property of an echo signal that is indicative of a change in the filling level of the product contained in the tank. Accordingly, the echo characteristic may be a parameter value from which the filling level can be deduced. However, it is not necessary to be able to deduce the filling level based on the echo characteristic. For example, the positions (in terms of time-of-flight, distance or any other unit) and/or amplitudes of peaks in an echo curve determined based on the echo signal may change if the filling level changes even if such peaks do not directly correspond to the surface echo. Hence, the positions and/or amplitudes of such peaks, and/or the echo curve itself may be an echo characteristic. The echo curve is also sometimes referred to as a waveform. An echo characteristic value is a value derived from an echo characteristic.

The present invention is based on the realization that, for intermittent operation of a level gauge system with alternating active and inactive periods, the amount of energy that has to be spent to get a sufficiently accurate filling level determination may be different from active period to active period. The present inventors have further realized that this insight can be used to reduce the average energy consumption by performing a first simple measurement, which may be referred to as a "one-shot measurement", and deciding how to proceed based on a difference between this first measurement and a stored measurement that has been determined with high accuracy.

If, based on the first measurement, the filling level appears to have changed since the last active period, several measurements—a burst of measurements—can be performed and the results of these measurements can be filtered, for example by averaging, to get a reliable and accurate filling level which is stored in memory. If, on the other hand, the filling level appears, based on the first measurement, to be substantially the same as the last time a measurement was performed, no more measurements need to be performed during the current active period, and the level gauge system may provide a filling level value that is based on the stored previously determined filling level or on both the stored previously determined filling level and the first measurement. In some embodiments and/or under some circumstances, it may be sufficient to discard the first measurement and provide the stored filling level as the current filling level. In other embodiments and/or under other circumstances, it may be beneficial to determine a new filling level value based on a combination of the first measurement performed during the current active period and at least one stored measurement value.

Hereby, the number of measurements performed in each active period will be dynamically decided depending on the actual measurement conditions and/or application. There may, for example, be applications where the filling level is practically unchanged most of the time and there is no need to frequently perform complete and highly accurate filling level measurements. On the other hand, changes may occur quickly and at that time a new filling level measurement with high accuracy and reliability may be required. For such and other applications, various embodiments of the present invention provide for a high accuracy in combination with very energy efficient operation.

From time to time, such as periodically with a predefined period, a "full" measurement cycle with a sufficient number of measurements to provide for a high accuracy filling level determination, for example through filtering, may be performed even if the difference between the present echo characteristic value and the stored echo characteristic is less than or equal to the predefined value.

Moreover, the above-mentioned stored echo characteristic may advantageously be indicative of a most recently performed filling level determination.

According to various embodiments, if the difference between the present echo characteristic value and the stored echo characteristic value is greater than the predefined value, the method may comprise the steps of: performing at least two filling level measurements, each comprising: transmitting an electromagnetic transmit signal towards the surface; receiving an electromagnetic surface echo signal being a reflection of the electromagnetic transmit signal at the surface; and determining a measurement value based on the electromagnetic surface echo signal; and determining the filling level by filtering measurement values of the at least two filling level measurements.

The at least two filling level measurements may be referred to as a "burst", and an accurate measure of the filling level may be achieved by filtering measurement values resulting from the at least two measurements. As was mentioned above, "filtering" may, for example, be performed through different kinds of averaging. Alternatively, or in combination, filtering may involve removing measurement values that differ considerably from the other measurement values. Such differing measurement values may be referred to as "outliers".

It should be noted that a measurement value being based on the first electromagnetic echo signal may or may not be included in the filling level determination. Accordingly, only the measurement values of the at least two filling level measurements may be filtered, or the measurement values of the at least two filling level measurements and a measurement value being based on the first electromagnetic echo signal may be filtered.

Advantageously, the time between the above-mentioned filling level measurements may be shorter than a time between transmission of a previous electromagnetic transmit signal on which the previous filling level measurement was based and transmission of the first electromagnetic signal. In other words, the time between individual measurements in a burst may advantageously be shorter than the inactive time having passed since the last measuring event. This will enable the desired noise cancellation through filtering.

To achieve the desired combination of reduced energy consumption and high accuracy, the time between the filling level measurements may be at least 100 times shorter than a time between transmission of a previous electromagnetic transmit signal on which the previous filling level measurement was based and transmission of the first electromagnetic signal.

In an exemplary embodiment, the time between individual measurements in a burst may be less than 1 second, while the time between a previous measurement and the above-mentioned first measurement, i.e. the time between active periods, may be in the range of several minutes, such as 2 minutes or more.

According to various embodiments the step of determining the filling level may comprise filtering a first measurement value being based on the first echo signal and a second measurement value being based on the second echo signal, if the difference between the present echo characteristic value and the stored echo characteristic is greater than the predefined value; and the step of determining the filling level may comprise filtering a first measurement value being based on the first echo signal and at least one stored measurement value indicative of at least one previous filling level measurement, if the difference between the present echo characteristic value and the stored echo characteristic is less than or equal to the predefined value.

In this manner, the noise cancellation achievable through averaging can be achieved both when too much has happened since the last filling level determination to involve a previously performed (performed during an earlier active period) filling level measurement in the filling level determination, and also when it is determined that the result of at least one previously performed measurement can indeed be included in the averaging.

In the latter case, averaging may be performed using a previously determined average value and the first measurement performed during the current active period. This averaging may advantageously be a weighted average to take into account how many measurements have been used to form the previously determined average value.

Alternatively, several individual measurement values may be stored in memory and averaging may be performed by averaging over a measurement value resulting from the first measurement performed in the current active period and the stored plurality of measurement values.

Furthermore, the method according to the present invention may advantageously further comprise the steps of: providing a wake-up signal to the level gauge system prior to the step of transmitting the first electromagnetic signal; and providing a sleep signal to the level gauge system after the step of determining the filling level.

Moreover, the present echo characteristic value may be a parameter value indicative of the filling level based on the first echo signal, and the stored echo characteristic may be a stored parameter value indicative of a previously determined filling level.

A "parameter value indicative of the filling level" should be understood any parameter value from which the filling level can be deduced. Such parameter values include, for example, the distance from a reference position at the top of the tank to the surface, the time-of-flight of the electromagnetic signal to the surface and back, a phase difference between a transmitted signal and a received signal etc.

According to a second aspect of the present invention, it is provided a level gauge system, for determining a filling level of a product contained in a tank, the level gauge system being controllable between an active state and an inactive state, the level gauge system comprising: a transceiver for generating, transmitting and receiving electromagnetic signals; a propagating device connected to the transceiver and arranged to propagate a transmitted electromagnetic signal towards a surface of the product inside the tank, and to receive an electromagnetic echo signal resulting from reflection of the transmitted electromagnetic signal at least one impedance transition; and processing circuitry connected to the transceiver, the processing circuitry comprising: operation control circuitry; comparing circuitry; filling level determination circuitry; and a memory, wherein: when the level gauge system has been controlled from the inactive state to the active state: the operation control circuitry controls the transceiver to transmit a first electromagnetic transmit signal towards the surface and to receive a first electromagnetic echo signal resulting from reflection at least one impedance transition encountered by the first electromagnetic transmit signal; the filling level determining circuitry determines a present echo characteristic value based on the first electromagnetic echo signal; the comparing circuitry compares the present echo characteristic value and a stored echo characteristic value acquired from the memory; if a difference between the present echo characteristic value and the stored echo characteristic value is greater than a predefined value: the operation control circuitry controls the transceiver to transmit at least a second electromagnetic transmit signal towards the surface and to receive at least a second electromagnetic echo signal resulting from reflection at least one impedance transition encountered by the second electromagnetic transmit signal; and the filling level determination circuitry determines the filling level based on the at least second electromagnetic echo signal, and if a difference between the present echo characteristic value and the stored echo characteristic value is less than the predefined value: the filling level determination circuitry determines the filling level based on stored data indicative of at least one previous filling level measurement.

The propagation device may be any device capable of propagating electromagnetic signals, including transmission line probes, waveguides and various types of radiating antennas such as horn antennas, parabolic antennas, rod antennas, array antennas etc.

It should be noted that the processing circuitry may be implemented as one or several microprocessors comprised in the level gauge system. Furthermore, the operation control circuitry, comparing circuitry and filling level circuitry may be implemented as individual microprocessors or as integrated functions in a single microprocessor or circuit board.

Furthermore, the level gauge system may advantageously further comprise a local energy store for providing electrical energy for operation of the level gauge system. The local energy source may advantageously, for example, comprise a battery and/or a super capacitor.

Moreover, the radar level gauge system may further comprise wireless communication circuitry, such as a radio transceiver, for wireless communication with a remote system.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION EXAMPLE EMBODIMENTS OF THE INVENTION

In the present detailed description, various embodiments of a method and a system according to the present invention are mainly discussed with reference to a radar level gauge system having a free propagating antenna such as a horn antenna for determination of a filling level of a product contained in a tank. It should be noted that this by no means limits the scope of the present invention which is equally applicable to other signal propagating devices including other free propagating antennas such as a rod antenna, a patch antenna, a fixed or movable parabolic antenna or a conical antenna, and wave guides such as a still pipe, a transmission line or a probe such as a single line probe (including a so called Goubau probe), a twin line probe or a coaxial probe.

Figure 1:
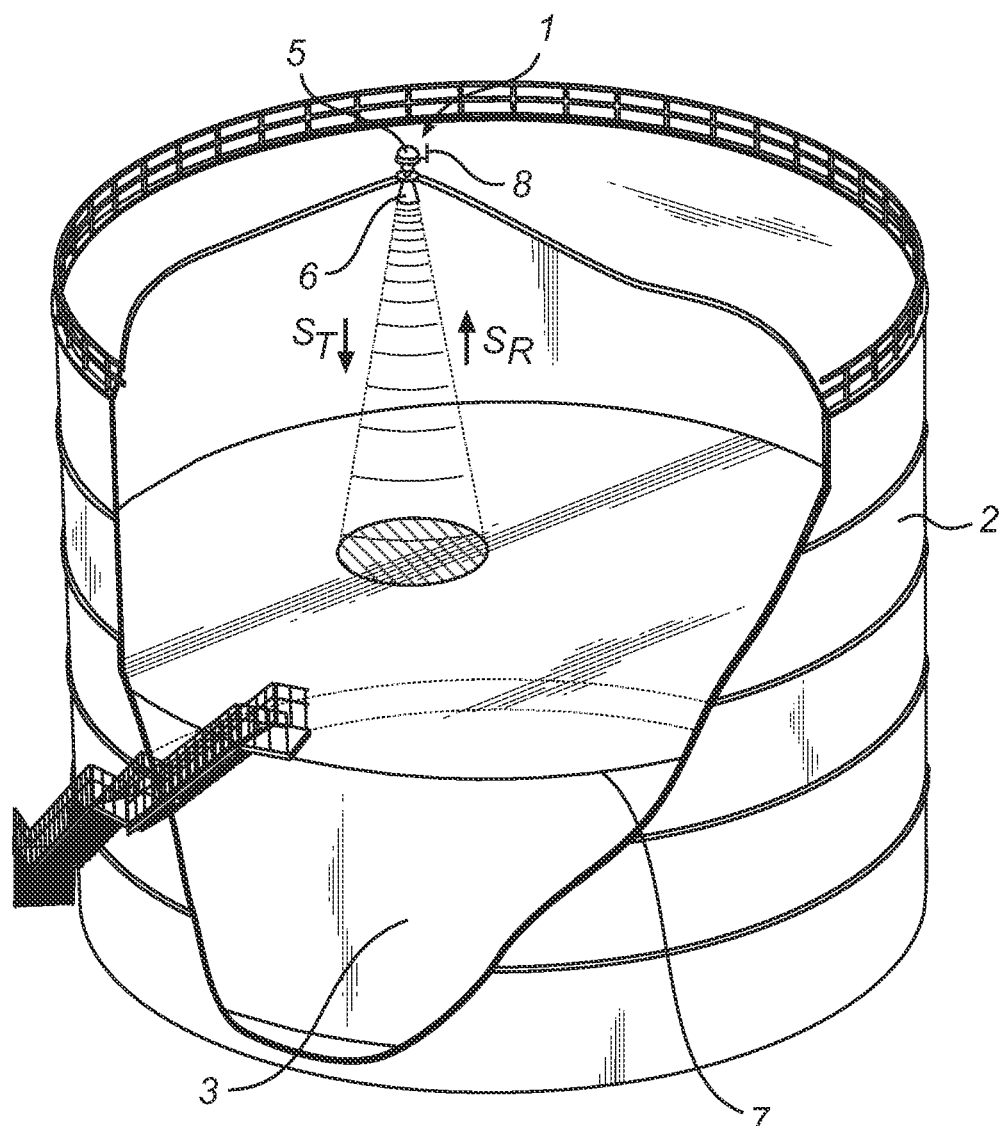
FIG. 1 schematically illustrates a level gauge system according to an embodiment of the present invention arranged to determine the filling level of a tank.

FIG. 1 schematically illustrates a level gauge system 1 arranged on top of a tank 2 for determining the filling level of a product 3 contained in the tank 2 using microwaves. The level gauge system 1 is therefore in the following referred to as a radar level gauge system or an RLG-system.

The radar level gauge system 1 comprises a measurement unit 5, a propagating device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$. From this distance and known dimensions of the tank 2, the filling level can be deduced.

It should be noted that, although a tank 2 containing a single product 3 is discussed herein, the distance to any material interface present in the tank 2 can be measured in a similar manner.

As is schematically illustrated in FIG. 1, the exemplary level gauge system 1 is configured to communicate with external devices, such as a remote control center, using wireless data transmission. For different applications, this may be advantageous, as wiring for communication may often represent a significant part of the cost for installing a level gauge system. A level gauge system configured for wireless communication may often also be required to receive power from a local energy source, such as a battery or similar. To keep the maintenance cost of the level gauge system 1 down, battery life should be as long as possible, preferably in the order of several years, which means that it is important to design the level gauge system 1 for a very low average energy consumption, without compromising the performance of the level gauge system 1 in terms of, for example, accuracy and ability to monitor changes in the tank 2. This is not only of importance for wireless level gauge systems 1, but also for a level gauge system that has other restrictions imposed on its supply of electrical power/energy. An example of such a level gauge system is a level gauge system that is powered through the communication lines, such as so-called two-wire radar level gauges, that communicate and receive electrical energy from a two-wire 4-20 mA current loop.

Figure 2:
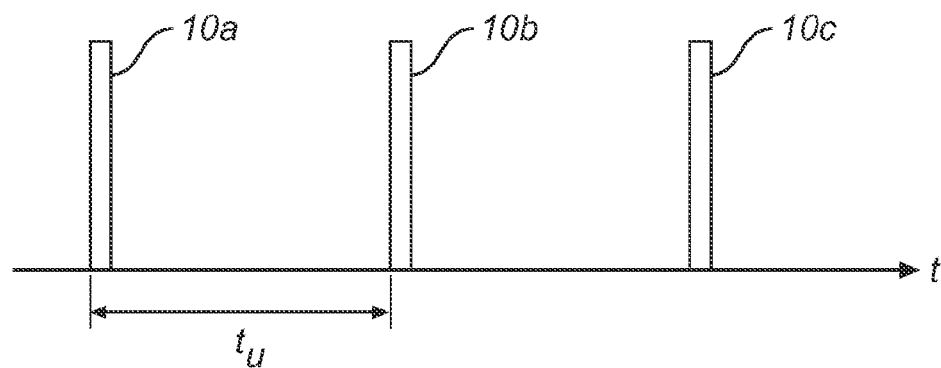
FIG. 2 schematically illustrates a driving scheme for intermittent operation of the level gauge system in FIG. 1.

A widely used scheme for handling situations where the average energy consumption is important is schematically illustrated in FIG. 2. As is schematically indicated in FIG. 2, filling level determination events 10a-c are separated in time, and between these filling level determination events 10a-c, the level gauge system 1 is in a low-power mode, where parts of the level gauge system that are used to determine the filling level may be turned off. This scheme is often referred to as intermittent operation, and the time $t_u$ between the filling level determination events defines an update frequency.

Due to the requirements on accuracy of the filling level determination, the filling level may be determined based on several filling level measurements that are filtered to remove various noise components. For this noise reduction method to work, however, there may not be a significant difference in the actual filling level between the filling level measurements that are used for determining the filling level. One way of ensuring this when intermittent operation is used is to set an update frequency that is so high that no significant changes in the filling level takes place between the filling level determination events 10a-c. This will, however, mean that the filling level determination events 10a-c often occur more frequently than is actually needed.

According to various embodiments of the present invention, this is mitigated by evaluating a first filling level measurement against a previous (advantageously the most recent) filling level determination, and perform a series of further filling level measurements if the first filling level measurement indicates that there has been a significant change in the filling level since the previous filling level determination. This inventive scheme will now be described in more detail with reference to the block diagram in FIG. 3 and the flow chart in FIG. 4.

Figure 3:
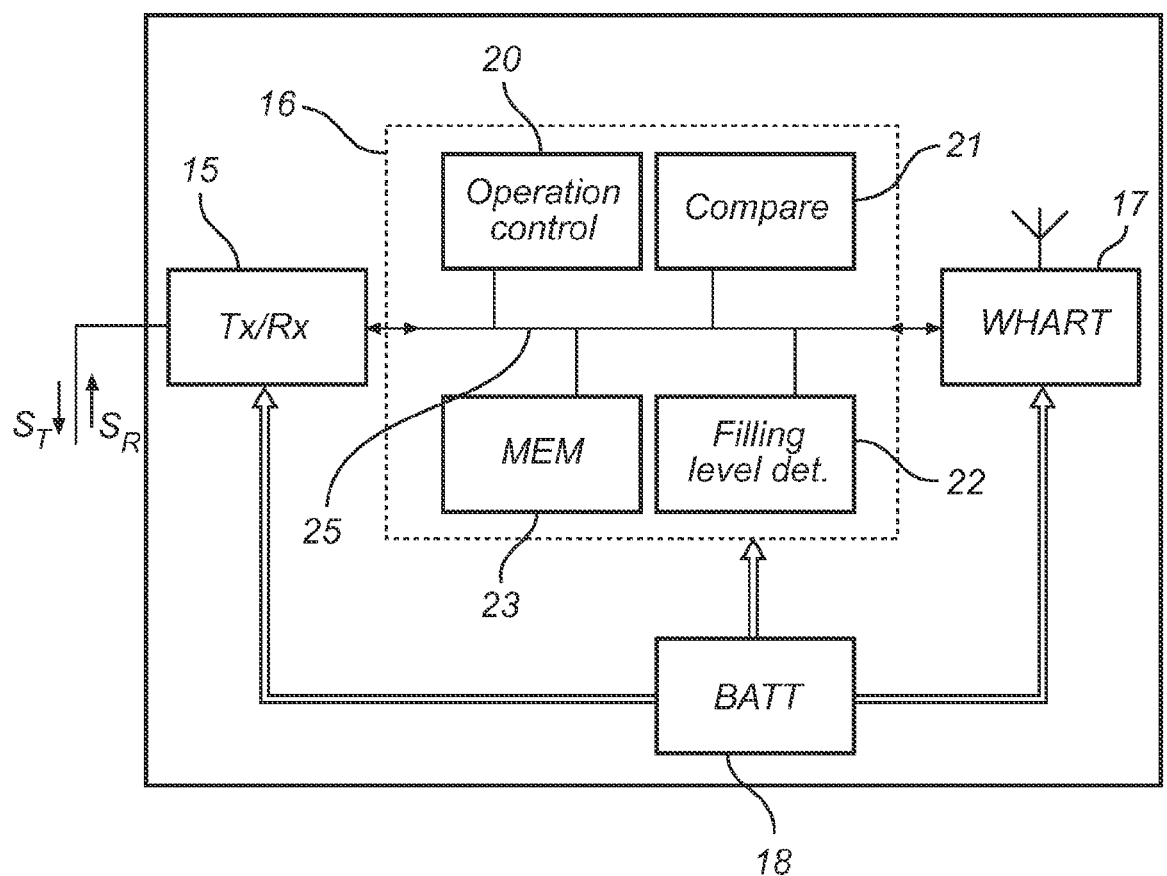
FIG. 3 is a schematic block diagram of level gauge system in FIG. 1.

With reference to FIG. 3, which is a block diagram of the measurement unit 5 in FIG. 1, the measurement unit 5 of the level gauge system 1 in FIG. 1 comprises a transceiver 15, processing circuitry 16 a wireless communication unit 17, which may advantageously be compliant with WirelessHART (IEC 62591), and a battery 18. The processing circuitry 16 comprises operation control circuitry 20, comparing circuitry 21, filling level determination circuitry 22 and a memory 23. These functional units comprised in the processing circuitry 16 may be implemented as separate hardware units, in the form of software blocks run on a microprocessor, or as a combination of separate hardware units and software run on a microprocessor.

The different functional units comprised in the processing circuitry 16 may be connected to a communication bus 25, and the transceiver 15 and the wireless communication unit 17 may be connected to the communication bus 25 through a suitable data interface. Furthermore, the transceiver 15, the processing circuitry 16 and the wireless communication unit 17 all receive energy from the battery 18 as is indicated by the block arrows in FIG. 3.

When the level gauge system 1 is in operation, the transceiver generates and transmits electromagnetic signals $S_T$ and receives a surface echo signal $S_R$. A measurement signal from which the time-of-flight of the surface echo signal can be determined is provided from the transceiver 15 to the processing circuitry 16.

The processing circuitry 16 determines the filling level, and/or another process parameter, and provides this information to a remote location via the wireless communication unit 17.

The processing circuitry 16 may also receive various commands via the wireless communication unit 17 and may control the transceiver 15 in response to such commands. In particular, the processing circuitry 16 may receive wake-up signals via the wireless communication unit 17, perform a filling level determination, report the determined filling level and then go back to sleep.

Figure 4:
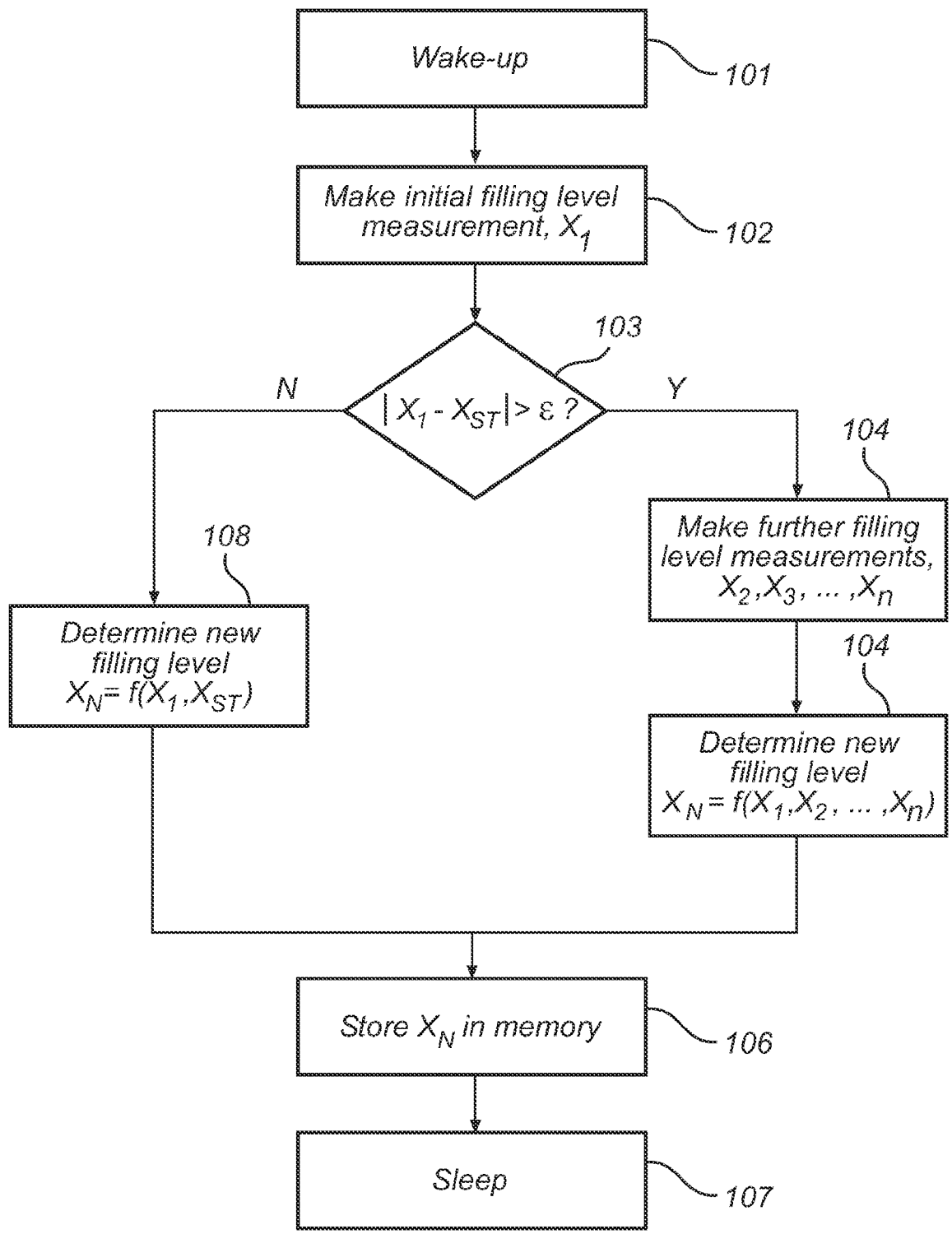
FIG. 4 is a flow chart outlining a method according to an embodiment of the invention.

With reference to the flow chart in FIG. 4 and the block diagram in FIG. 3, an exemplary method according to an embodiment of the present invention will now be described.

In a first step 101, the level gauge system 1 is controlled from an inactive state to an active state. In practice, a wake-up command may be received by the wireless communication unit 17, which then provides a wake-up signal to the processing circuitry 16. In response to the wake-up signal, an initial filling level measurement is performed in step 102. To perform this initial filling level measurement, the operation control circuitry 20 controls the transceiver 15 to transmit a first electromagnetic transmission signal $S_{T1}$ towards the surface 7 and to receive a first surface echo signal $S_{R1}$ being a reflection of the first transmission signal $S_{T1}$ at the surface 7. The filling level determination circuitry 22 then determines a present filling level $X_1$ (or other parameter indicative of the filling level).

In the next step 103, the comparing circuitry 21 acquires a stored filling level $X_{st}$ from the memory 23 and compares the present filling level $X_1$ and the stored filling level $X_{st}$. If it is determined in step 103 that the difference between the present filling level $X_1$ and the stored filling level $X_{st}$ is greater than a predefined value $\epsilon$, the method proceeds to step 104. Otherwise, if the difference between the present filling level $X_1$ and the stored filling level $X_{st}$ is smaller than or equal to the predefined value $\epsilon$, the method proceeds to step 108.

In step 104, the operation control circuitry 20 controls the transceiver 15 to transmit a second electromagnetic transmission signal $S_{T2}$ towards the surface 7 and to receive a second surface echo signal $S_{R2}$ being a reflection of the second transmission signal $S_{T2}$ at the surface 7. The filling level determination circuitry 22 then determines a second filling level measurement value $X_2$ (or other parameter indicative of the filling level). As is indicated in the flow chart in FIG. 4, this procedure may be repeated a number of times until a sufficient number of measurement values $X_1, X_2, \ldots, X_n$ have been provided to achieve the desired trade off between energy consumption and measurement accuracy. This may depend on the field of application and/or on the conditions in the tank 2.

In the subsequent step 105, a new filling level $X_N$ is determined by the filling level determination circuitry 22 by filtering the measurement values $X_1, X_2, \ldots, X_n$ (or a subset of these measurement values, such as $X_2, \ldots, X_n$) obtained in step 104. The new filling level $X_N$ is stored in memory 23 in step 106, and the level gauge system 1 is returned to its inactive state in step 107.

If, in step 103, the difference between the present filling level $X_1$ and the stored filling level $X_{st}$ was instead determined to be smaller than or equal to the predefined value $\epsilon$, the method proceeds to step 108.

In step 108, a new filling level $X_N$ is determined by the filling level determination circuitry 22 based on the previously determined filling level $X_{st}$ and the currently measured momentary filling level $X_1$. The new filling level $X_N$ may, for example, be determined by filtering the momentary filling level $X_1$ and the previously determined filling level $X_{st}$ through weighted averaging. Alternatively, the new filling level $X_N$ can be assigned to be equal to the previously determined filling level. Which of these and other strategies for determining the new filling level $X_N$ is selected may depend on the particular application and/or the historic fluctuations of the filling level in the tank 2.

After having completed step 108, the method proceeds to steps 106 and 107 as was described above.

The person skilled in the art realizes that the present invention by no means is limited to the preferred embodiments described above. On the contrary, many modifications and variations are possible within the scope of the appended claims.

What is claimed is:

1. A method of determining a filling level of a product contained in a tank using a level gauge system comprising a transceiver; a propagating device connected to said transceiver; and processing circuitry connected to said transceiver, said method comprising the steps of:
   transmitting, by said transceiver, a first electromagnetic transmit signal and propagating said first electromagnetic transmit signal towards a surface of said product using said propagating device;
   receiving, by said transceiver, a first electromagnetic echo signal resulting from reflection at at least one impedance transition encountered by said first electromagnetic transmit signal;
   determining, by said processing circuitry, a present echo characteristic value based on said first electromagnetic echo signal; and
   comparing, by said processing circuitry, said present echo characteristic value and a stored echo characteristic value,
   wherein said method further comprises the steps of:
   if a difference between said present echo characteristic value and said stored echo characteristic value is determined by said processing circuitry to be greater than a predefined value:
      transmitting, by said transceiver, at least a second electromagnetic transmit signal and propagating said at least second electromagnetic transmit signal towards said surface;
      receiving, by said transceiver, at least a second electromagnetic echo signal resulting from reflection at at least one impedance transition encountered by said second electromagnetic transmit signal; and
      determining, by said processing circuitry, said filling level based on said at least second electromagnetic echo signal, and
   if a difference between said present echo characteristic value and said stored echo characteristic value is determined by said processing circuitry to be less than said predefined value:
      determining, by said processing circuitry, said filling level based on stored data indicative of at least one previous filling level measurement.

2. The method according to claim 1, wherein, if said difference between said present echo characteristic value and said stored echo characteristic value is greater than said predefined value, said method comprises the steps of:
   performing at least two filling level measurements, each comprising:
      transmitting, by said transceiver, an electromagnetic transmit signal and propagating said electromagnetic transmit signal towards said surface using said propagating device;
      receiving, by said transceiver, an electromagnetic surface echo signal being a reflection of said electromagnetic transmit signal at said surface; and
      determining, by said process circuitry, a measurement value based on said electromagnetic surface echo signal; and
      determining, by said processing circuitry, said filling level by filtering measurement values of said at least two filling level measurements.

3. The method according to claim 2, wherein a time between said filling level measurements is shorter than a time between transmission of a previous electromagnetic transmit signal on which said previous filling level measurement was based and transmission of said first electromagnetic signal.

4. The method according to claim 3, wherein said time between said filling level measurements is at least 100 times shorter than a time between transmission of a previous electromagnetic transmit signal on which said previous filling level measurement was based and transmission of said first electromagnetic signal.

5. The method according to claim 1, wherein:
   if said difference between said present echo characteristic value and said stored echo characteristic value is less than said predefined value:
      said step of determining said filling level comprises filtering a first measurement value being based on said first electromagnetic echo signal and at least one stored measurement value indicative of said at least one previous filling level measurement.

6. The method according to claim 5, wherein, if said difference between said present echo characteristic value and said stored echo characteristic value is less than said predefined value:
   said at least one stored measurement value is indicative of an average of a plurality of previous filling level measurements, and said averaging is a weighted averaging, wherein said first measurement value being based on said first electromagnetic echo signal is given a smaller weight than said stored measurement value.

7. The method according to claim 1, further comprising the steps of:
   providing a wake-up signal to said level gauge system prior to the step of transmitting said first electromagnetic transmit signal; and
   providing a sleep signal to said level gauge system after said step of determining said filling level.

8. The method according to claim 1, wherein said present echo characteristic value is a parameter value indicative of said filling level based on said first electromagnetic echo signal, and said stored echo characteristic value is a stored parameter value indicative of a previously determined filling level.

9. A level gauge system, for determining a filling level of a product contained in a tank, the level gauge system being controllable between an active state and an inactive state, said level gauge system comprising:
   a transceiver for generating, transmitting and receiving electromagnetic signals;
   a propagating device connected to said transceiver and arranged to propagate a transmitted electromagnetic signal towards a surface of said product inside the tank, and to receive an electromagnetic echo signal resulting from reflection of the transmitted electromagnetic signal at at least one impedance transition; and
   processing circuitry connected to said transceiver, said processing circuitry comprising:
   operation control circuitry;
   comparing circuitry;
   filling level determination circuitry; and
   a memory,
   wherein:
   when the level gauge system has been controlled from said inactive state to said active state:
      the operation control circuitry controls the transceiver to transmit a first electromagnetic transmit signal towards said surface and to receive a first electromagnetic echo signal resulting from reflection at at least one impedance transition encountered by said first electromagnetic transmit signal;

the filling level determining circuitry determines a present echo characteristic value based on said first electromagnetic echo signal;

the comparing circuitry compares said present echo characteristic value and a stored echo characteristic value acquired from said memory;

if a difference between said present echo characteristic value and said stored echo characteristic value is greater than a predefined value:

the operation control circuitry controls the transceiver to transmit at least a second electromagnetic transmit signal towards said surface and to receive at least a second electromagnetic echo signal resulting from reflection at at least one impedance transition encountered by said second electromagnetic transmit signal; and the filling level determination circuitry determines said filling level based on said at least second electromagnetic echo signal, and if a difference between said present echo characteristic value and said stored echo characteristic value is less than said predefined value:

the filling level determination circuitry determines said filling level based on stored data indicative of at least one previous filling level measurement.

10. The level gauge system according to claim 9, wherein, if said difference between said present echo characteristic value and said stored echo characteristic value is greater than said predefined value:

the operation control circuitry controls the level gauge system to perform at least two filling level measurements, each comprising:

transmitting an electromagnetic transmit signal towards said surface;

receiving an electromagnetic surface echo signal being a reflection of said electromagnetic transmit signal at said surface; and determining a measurement value based on said electromagnetic surface echo signal; and the filling level determining circuitry determines said filling level by filtering measurement values of said at least two filling level measurements.

11. The level gauge system according to claim 10, wherein a time between said filling level measurements is shorter than a time between transmission of a previous electromagnetic transmit signal on which said previous filling level measurement was based and transmission of said first electromagnetic signal.

12. The level gauge system according to claim 11, wherein said time between said filling level measurements is at least 100 times shorter than a time between transmission of a previous electromagnetic transmit signal on which said previous filling level measurement was based and transmission of said first electromagnetic signal.

13. The level gauge system according to claim 9, wherein, if said difference between said present echo characteristic and said stored echo characteristic value is less than said predefined value:

said filling level determination circuitry determines said filling level by filtering a first measurement value being based on said first electromagnetic echo signal and at least one stored measurement value indicative of said at least one previous filling level measurement.

14. The level gauge system according to claim 9, wherein said level gauge system further comprises a local energy store for providing electrical energy for operation of said level gauge system.

15. The level gauge system according to claim 9, wherein said level gauge system further comprises wireless communication circuitry for wireless communication with a remote system.

* * * * *